United States Patent
Schneider (10) Patent No.: US 10,085,557 B2
(45) Date of Patent: Oct. 2, 2018

(54) ADJUSTMENT DEVICE, GUIDE UNIT AND ITEM OF FURNITURE

(71) Applicant: Grass GmbH, Hoechst (AT)

(72) Inventor: Klaus Schneider, Hoechst (AT)

(73) Assignee: Grass GmbH, Hoechst (AT)

( * ) Notice: Subject to any disclaimer, the term of this patent is extended or adjusted under 35 U.S.C. 154(b) by 0 days.

(21) Appl. No.: 15/386,155

(22) Filed: Dec. 21, 2016

(65) Prior Publication Data

US 2017/0172299 A1    Jun. 22, 2017

(30) Foreign Application Priority Data

Dec. 22, 2015   (DE) .................... 20 2015 107 020 U (51) Int. Cl.
  *A47B 88/40*    (2017.01)
  *A47B 88/42*    (2017.01)
  (Continued)

(52) U.S. Cl.
  CPC .......... *A47B 88/407* (2017.01); *A47B 88/427* (2017.01); *F16C 29/001* (2013.01); *F16C 2314/72* (2013.01)

(58) Field of Classification Search
  CPC . A47B 88/407; A47B 88/0407; A47B 88/463; A47B 2210/0054;
  (Continued)

(56) References Cited

U.S. PATENT DOCUMENTS

| 8,727,460 B2* | 5/2014 | Grabher ................... E05F 5/02 312/333 |
| 2014/0077678 A1 | 3/2014 | Holzapeel et al. |
| 2014/0185968 A1* | 7/2014 | Langguth .......... A47B 88/0407 384/22 |

FOREIGN PATENT DOCUMENTS

| AT | 510 954 B1 | 8/2012 | |
| CN | 203506055 U | * 4/2014 | ............. A47B 88/04 |

(Continued)

OTHER PUBLICATIONS

German Search Report (Application No. 20 2015 107 020.9) dated Sep. 30, 2016.

(Continued)

*Primary Examiner* — Andrew M Roersma
(74) *Attorney, Agent, or Firm* — Burr & Brown, PLLC (57) ABSTRACT

A device for adjusting a position of a furniture part on an item of furniture such that a closed position of the furniture part is predeterminable. The device includes an adjustment element for rotating a positioning default mechanism, and an abutment portion which interacts with an adjustment contour of the adjustment element. The adjustment contour extends as a spiral, by way of which a region of the adjustment contour and the abutment portion interact in such a manner that a stop of the device is slidable into a position, so that the closed position of the furniture part is predeterminable. The adjustment contour comprises a multi-edge portion with several surface portions which are aligned at an angle with respect to one another. The adjustment contour interacts with a counter portion on the abutment portion in such a manner that several predetermined rotational positions of the adjustment element are configurable.

12 Claims, 4 Drawing Sheets

(51) Int. Cl.
*F16C 29/00* (2006.01)
*A47B 88/407* (2017.01)
*A47B 88/427* (2017.01)

(58) Field of Classification Search
CPC .......... A47B 2210/091; A47B 88/0477; A47B 88/47; A47B 88/0481; A47B 88/427; A47B 88/0422; A47B 2088/4274; A47B 2088/0429; F16C 29/001; F16C 2314/72
See application file for complete search history.

(56) References Cited

FOREIGN PATENT DOCUMENTS

| | | | | |
|---|---|---|---|---|
| CN | 203860779 U | * | 10/2014 | ............. A47B 88/04 |
| DE | 2 301 637 A1 | | 7/1974 | |
| DE | 202013002233 U1 | * | 6/2014 | ........... A47B 88/956 |
| DE | 10 2013 005 512 A1 | | 10/2014 | |
| DE | 10 2013 104 829 A1 | | 11/2014 | |
| EP | 2 222 202 A1 | | 9/2010 | |
| EP | 2815680 A1 | * | 12/2014 | ........... A47B 88/956 |
| GB | 1 451 388 A | | 9/1976 | |
| WO | WO2009080403 A1 | * | 7/2009 | ........... A47B 88/956 |

OTHER PUBLICATIONS

Extended European Search Report (Application No. 16205458.9) dated Mar. 27, 2017.

* cited by examiner

ADJUSTMENT DEVICE, GUIDE UNIT AND ITEM OF FURNITURE

This application claims the benefit under 35 USC § 119(a)-(d) of German Application No. 20 2015 107 020.9 filed Dec. 22, 2015, the entirety of which is incorporated herein by reference.

FIELD OF THE INVENTION

The present invention relates to an adjustment device, a guide unit and item of furniture.

BACKGROUND OF THE INVENTION

In the case of items of furniture or in the case of guide units for guiding the movement of furniture parts in relation to a furniture cabinet of the item of furniture, devices are known which serve to adjust the position of the moveable furniture part on the item of furniture, which refers, in particular, to a closed position of the furniture part on the item of furniture. The adjustment of the position of the furniture part concerns, for example, in the case of drawers, in particular, with regard to a front gap, a height position and/or a tilt of the drawer. The front gap, for example, is formed in the closed state of a drawer between an inside surface of a front element of the drawer and oppositely situated narrow end-face side walls of the furniture cabinet. The front gap of a furniture part on the item of furniture varies or is not precisely predeterminable on account of manufacturing and mounting tolerances, such that adjustability of the front gap is necessary for a uniform front appearance of the item of furniture or for the reliable functioning, for example, of a touch-latch functionality on the item of furniture.

Previous adjustment devices do not result in a permanently reliable adjustment in all cases that occur in practice.

SUMMARY OF THE INVENTION

It is the object of the present invention to provide in an improved manner an adjustment device of the type explained in the introduction or a furniture part guide unit and a corresponding item of furniture with regard to an adjustment that is permanently reliable in practice, in particular, with regard to a front gap adjustment, height adjustment and/or tilt adjustment of furniture drawers, furniture flaps or furniture doors on an item of furniture.

The present invention relates to a device for adjusting a position of a furniture part on an item of furniture, wherein by way of the adjustment, the position of the furniture part in a closed position on a furniture cabinet of the item of furniture is predeterminable, and wherein the furniture part is attachable on the furniture cabinet so as to be movable by means of a guide unit, the device including a positioning default mechanism which are provided between the furniture cabinet and the movable furniture part, wherein the positioning default mechanism includes an adjustment element, which is rotatable about a rotational axis on a rotary bearing, and an abutment portion which interacts with an adjustment contour of the adjustment element, wherein the adjustment contour is, realized extending in the manner of a spiral with respect to the rotational axis, by way of which, in dependence on the rotational position of the adjustment element, a region of the adjustment contour which is effective on the abutment portion is slid into a position as a result of which the position of the furniture part in the closed position is predeterminable.

The guide unit can be, for example, a pivot guide member or a linear guide member such as a rail guide for drawers, for example a part pull-out runner or a full pull-out runner with rails that are slidable in relation to one another or are telescopic. A full pull-out runner comprises a cabinet rail that is positionally fixed in the mounted state, a center rail that is slidable thereon and a drawer rail that is connectable to the furniture part and is received so as to be slidable on the center rail. As a rule, two guide units are provided for one drawer, such that the drawer is supported over the width thereof on oppositely situated bottom-side or side portions on the furniture cabinet so as to be slidably movable.

The adjustment contour comprises, in the circumferential direction with respect to the rotational axis of the adjustment element, a multi-edge portion with several surface portions which are aligned at an angle with respect to one another, wherein the adjustment contour interacts with a counter portion on the abutment portion in such a manner that several predetermined rotational positions of the adjustment element are configurable, wherein in each predetermined rotational position of the adjustment element, a surface portion of the adjustment contour abuts in a planar manner against the counter portion, as a result of which a resistance is set up against a rotation of the adjustment element.

With each of the several predetermined rotational positions of the adjustment element, another position of the furniture part on the item of furniture can be provided or set up. Preferably, the counter portion includes precisely one counter surface which is movable into abutment in a planar manner with a surface portion of the adjustment contour. As an alternative to this, precisely two counter surfaces, which are movable into abutment with two surface portions of the adjustment contour in a rotational position of the adjustment element, are present on the counter portion.

A self-locking effect for the device is preferably set up by way of the resistance that can be set up in each rotational position. In an advantageous manner, the self-locking effect is effective advantageously in the same manner in each rotational position of the adjustment device that can be set up and is associated with an adjustment state.

By way of the multi-edge form of the adjustment contour, angled transitions are created between two adjacent multi-edge surfaces or the even or straight surface portions which act as mechanical stops. The stops lock a relative movement between the multi-edge portion and the counter portion abutting in a supporting manner against the multi-edge portion or the surface portion.

Compared to a curved or a concavely or convexly formed progression of the adjustment contour, which is shoulder-free and does not act in a mechanically locking manner against an adjustment in the case of externally acting compressive or tensile forces, the proposed adjustment contour is more reliable. For by way of the multi-edge form or by way of the polygonal form of the adjustment contour and by way of the associated counter portion, in each configured rotational position of the adjustment device it is set up so as to be self-locking, in particular, as a result of positive locking.

In an advantageous manner, forces and torques, which act from the outside upon the guide unit, the furniture part and/or on the item of furniture, for example, compressive forces which act upon the adjustment contour or the counter portion, do not result, on account of the invention, in any unwanted or automatic change in the configured position between the adjustment contour and the counter portion. In practice, relevant external forces and torques, are, for example, caused by vibrations on or in the region of the furniture, for example, as a result of an impact against the item of furniture, and/or caused by the effect of weight on account of loading the furniture part with objects, in particular, when the furniture part is moved or is stressed intermittently when it reaches its end position.

The counter portion is preferably matched to the dimension and/or to the form of the adjustment contour. The counter portion and the adjustment contour mutually abut advantageously in a forced manner in each configurable rotational position of the adjustment element. In this case, there is full surface abutment of the counter portion and the associated surface portion of the adjustment contour. Adhesion-increasing effects, in particular, adhesive friction effects, are achievable by way of the surface contact.

Oppositely-situated edges of the counter portion preferably adjoin surface portions of the adjustment contour which connect at an angle to the relevant surface portion on both sides. Consequently, with reference to the two possible lateral adjustment directions of the relevant surface portion, resistance is countered by the counter portion such that automatic adjustment is not able to occur in practice. The resistance is such that it can only be eliminated by manual adjustment from the outside as a result of rotating the adjustment element.

The adjustment device is preferably attachable to the guide unit, for example, to a drawer rail of a drawer guide. The adjustment device preferably serves for adjusting a dimension of a front gap of the movable furniture part which is realized between an inside surface of a front element of the movable furniture part and front portions of the furniture cabinet when the drawer is situated in an idle, closed position on the item of furniture. In principle, an alternative attachment of the adjustment device on the furniture part or on the furniture cabinet is conceivable.

In another embodiment of the present invention, the multi-edge portion includes several surface portions which are adjacent in the direction of extension of the adjustment contour. Consequently, in each case, one of a plurality of different configurable adjustment positions can be set up in a freely selectable manner. As a result of rotating the adjustment element, a desired surface portion of the several surface portions comes to abut in a planar manner against the counter portion. As each surface portion, on account of the spiral development of the adjustment contour, is a different width or at a different radius from the rotational axis of the adjustment element, there is a relative movement in an adjustment direction of the adjustment device between the adjustment contour and the counter portion. A corresponding relative bearing arrangement is provided for the relative movement. For example, a sliding bearing arrangement for a linear movement back and forth or a relative movement between the adjustment element and the counter portion. As the adjustment element and the counter portion are, as a rule, received on respective component portions such as, for example, on respective housing portions of the adjustment device, for example, a sliding bearing arrangement is set up between the housing portions. As associated maximum sliding path in two opposite adjustment directions which corresponds, in particular, to a maximum adjustment path of the adjustment device, is preferably a few millimeters, for example, between 2 and 10 millimeters. The adjustment contour is matched accordingly such that the path can be provided as a result of rotating the adjustment element between end stop positions. The difference between a radial spacing of a surface portion of the adjustment contour, which is nearest the rotational axis radially, and a radial spacing of a surface portion of the adjustment contour which is furthest away radially from the rotational axis, provides a maximum adjustment path of the adjustment device.

All the surface portions are preferably present adjacent to one another without a portion located in between remaining free or not providing an even surface portion to abut against the counter portion. An adjustment, which is very finely stepped to almost stepless, of the position of the furniture part is consequently possible.

The multi-edge portion or the surface portions are correspondingly continuously developed preferably over the entire spiral curve of the adjustment contour.

All the surface portions are preferably developed in a similar manner or identically, in particular, are realized with the same dimensions in an even and flat manner. Typical length and/or width dimensions of the surface portions that are preferably rectangular in the base area are within the range of between less than one and circa two millimeters.

It is also preferred when the surface quality of all the surface portions is similar, where applicable, for example, with a predetermined roughness, which in the case of increased surface roughness, increases the static friction in the state of abutment against the counter portion. This is also advantageous with regard to unwanted adjustment of an adjustment state.

In addition, it is advantageous when the surface portions are aligned in an angled manner in each case at the same angle with respect to one another or the same angle is realized in each case between adjacent surface portions. A comparatively flat angle between adjacent surface portions is preferably present.

A practice-relevant adjustment contour can comprise, for example, between 10 and 15 surface portions over approximately a semicircular sector of the spiral of the adjustment contour.

Furthermore, it is advantageous for the adjustment contour to extend over a curved portion of about 300 angular degrees, in particularly over at least almost 360 angular degrees circumferentially with respect to the rotational axis of the adjustment element. As an alternative to this, an extension, for example, over a semicircular sector or a quadrant sector is advantageous.

Furthermore, it is advantageous when the adjustment contour is developed as a web-like, protruding elevation on a base plate of the adjustment element. As a result, a compact realization of the adjustment contour is achieved. The web-like elevation preferably comprises a comparatively narrow form or a small thickness which, just as the height of the elevation, is, for example, within the millimeter range.

The elevation protrudes on the base plate in the direction of the rotational axis or in the direction of the longitudinal direction of the rotational axis.

In another embodiment of the present invention, the adjustment contour comprises oppositely situated outside surfaces, wherein each outside surface includes, in each case, several surface portions which are aligned at an angle with respect to one another. The respectively oppositely situated surface portions are spaced apart from one another radially with respect to the rotational axis, as a result of which the distance corresponds to the radial width of the adjustment contour or the web-like elevation. Preferably in one rotational position of the adjustment element, the oppositely situated surface portions act in pairs together with, in each case, an associated counter portion. The oppositely situated surface portions are preferably parallel in their surface alignment. The counter portions with their respective surfaces are preferably also parallel to one another. The spacing between the counter portions is preferably matched to the width of the adjustment contour or the web-like elevation in such a manner that the adjustment contour with the respective oppositely situated surface portions comes to abut against the counter portions when one of the predetermined rotational positions is set up. Where applicable, a comparatively very small clearance is effective between the surface portions and the counter portions, further rotation of the adjustment element out of one rotational position into another rotational position always being possible and not being blocked.

The counter portions being offset with respect to one another in the circumferential direction of the rotational axis of the adjustment element is, in principle, not excluded. Consequently, in one rotational position of the adjustment element, a first counter portion abuts on the outside of the adjustment contour against a first radially outer surface portion, and the other counter portion abuts against another radial inner surface portion which is not opposite the first surface portion, as a result of which the abutment is not effected by means of a surface portion which is situated opposite on the adjustment contour.

In another embodiment of the present invention, the adjustment element comprises a control portion for rotating the adjustment element from the outside. As a result, simple and secure rotation of the adjustment element by one person, in particular manually, is facilitated. The control portion is preferably realized over an entire circular ring region or a circumferential region of the adjustment element. A structure for facilitating torque transmission such as a groove structure or tooth structure is preferably present on the control portion.

In addition to this or as an alternative to it, a control portion which is axially accessible to the rotational axis is realized on the adjustment element, for example, in the region of the rotational axis. The control portion can be developed so as to match the form of a turning tool, such as a Phillips type screwdriver, for rotation by way of such a turning tool.

According to another embodiment of the present invention, the abutment portion is developed on an elevation portion which is realized in a raised manner with respect to a base surface. The elevation portion comprises an even, flat or flattened surface. The flat surface is matched to the surface portions of the adjustment contour in order to move into abutment, in each case, with preferably precisely one surface portion of the adjustment contour in all provided rotational positions of the adjustment element.

The base surface, on which the elevation portion protrudes is, for example, an inside surface of a housing of the adjustment device. The inside surface of the housing is opposite the adjustment element such that the elevation portion interacts with its flat side with the adjustment contour of the adjustment element or abuts with a surface portion of the adjustment contour.

The abutment portion preferably comprises two raised portions with, in each case, one flat side in such a manner that in a predetermined rotational position of the adjustment element both flat sides abut against, in each case, a surface portion, which improves the self-locking effect compared to one single surface abutment.

The device of the present invention can take the form of a component that is attachable to a guide unit, in particular, attachable to a drawer guide or to a drawer or movement rail of a part pull-out runner or a full pull-out runner. A portion of the adjustment device which is movable as a result of rotating the adjustment element, is, in this case, in contact with a stop which is positionally fixed on the item of furniture or on the furniture cabinet. Consequently, the relative position of the drawer rail to the furniture cabinet is determined as a result of rotating the adjustment element. To adjust the front gap, the movable portion of the adjustment device is adjusted, for example, by a few millimeters back or forth, such that, as a result, the drawer rail is adjusted correspondingly relative to the cabinet rail or to the furniture cabinet in a first movement direction or in a second opposite movement direction of the drawer rail.

The device can also have a second device part which is slidable in a linear manner relative to a first device part of the device as a result of rotating the adjustment element, wherein the abutment portion is present on one of the two device parts. This provides a reliable and space-saving arrangement.

The component of the adjustment device can be fitted releasably, for example, on the drawer rail, the movable portion knocking against a fixed stop which is assigned to the cabinet rail. The secure pulling of the movable portion against the fixed stop is preferably realized with an automatic draw-in mechanism by the drawer rail being pulled into its closed position under the effect of a draw-in force storage device, the adjustment device also abutting against the fixed stop. The stop situation is always set up in the closed state of the drawer rail, even during the adjustment of the front gap, irrespective of the direction in which the movable part of the adjustment device is adjusted.

It is additionally advantageous for a visual indicator to be present which serves for the visual display of a relative position of a slidable device part with reference to the device. As a result, it is possible for a person to work out quickly in which adjustment state the device is situated. In particular, the visual indicator serves for showing an adjustment and an adjustment direction, for example, with regard to a front gap of a drawer.

The present invention also extends to a guide unit, in particular, a draw guide such as, for example, a part or full pull-out runner, with a device according to one of the above-described developments. The guide unit can comprise an automatic draw-in mechanism for pulling the drawer in a force-supported manner into a closed position on the item of furniture or into the closed position of the drawer.

With the adjustment device it is possible to perform, in particular, a front gap adjustment, an adjustment of a tilt of the furniture part or of the drawer on the item of furniture and/or an adjustment of a height position of the furniture part relative to the guide unit and consequently relative to the item of furniture.

Finally, the present invention relates to an item of furniture with a movable furniture part, a guide unit as realized above being present. In particular, a movable drawer is present on the item of furniture so as to be slidable by means of two comparably acting guide units. An adjustment device is preferably provided on both guide units.

BRIEF DESCRIPTION OF THE DRAWINGS

Further features and advantages of the invention are explained in more detail by way of exemplary embodiments of an adjusting device according to the invention.

DETAILED DESCRIPTION OF THE INVENTION

Figure 13:
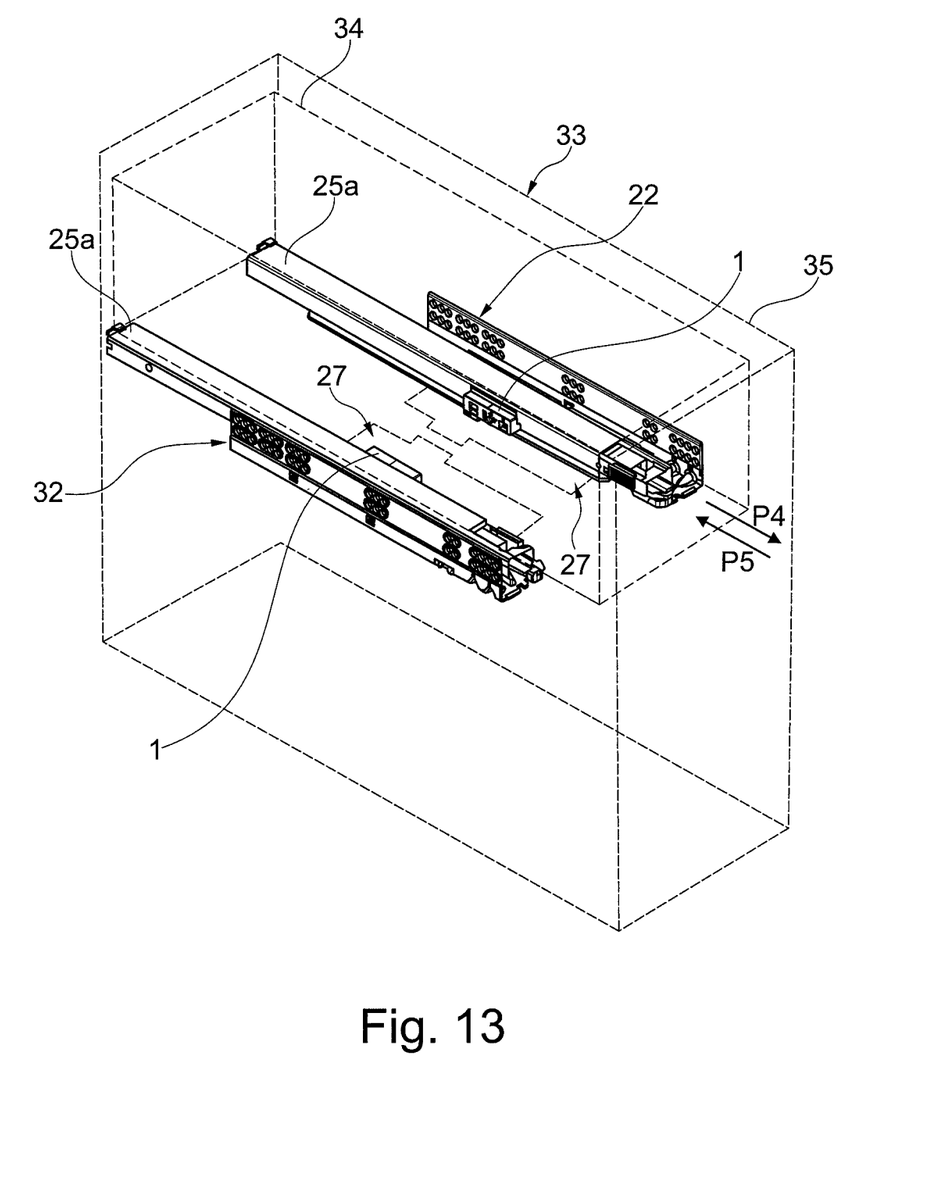
FIG. 13 shows an item of furniture with a drawer received thereon in a closed position, in a strongly schematic representation with outlines shown by broken lines, there being present a guide unit according to FIG. 11 and a further guide unit for slidingly guiding the drawer on the item of furniture in each case by way of an adjustment device according to the present invention.

An adjustment device 1 according to the present invention, produced, for example, from a plastics material, is preferably developed as a removable part component which is releasably attachable to a guide unit 22 or 32. The guide units 22 or 32 enable a movable furniture part, realized as a drawer 34, to be guided in a horizontal sliding manner on a furniture cabinet 35 of an item of furniture 33 such as a kitchen cupboard (see FIG. 13). In FIG. 13 the drawer 32 is situated in a closed state on the item of furniture 33. A front element of the drawer 34, which, in the closed state of the drawer 34, is at a spacing of a few millimeters from the end-face narrow sides of the furniture cabinet 35 by means of a front gap, is not shown in FIG. 13.

Figure 1:
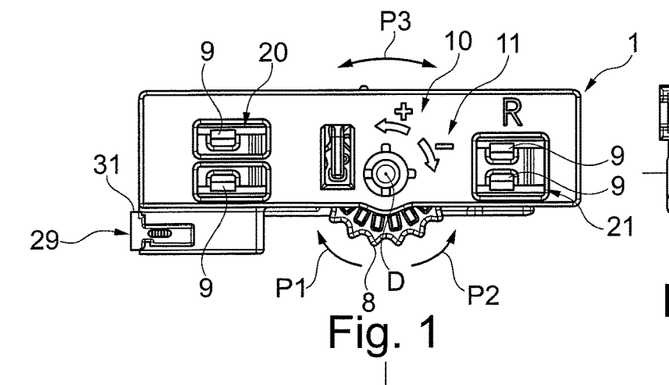
FIG. 1 shows a front view of an adjustment device according to the present invention.
Figure 2:
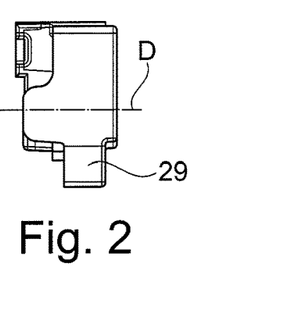
FIG. 2 shows the adjustment device according to FIG. 1 from the side.
Figure 3:
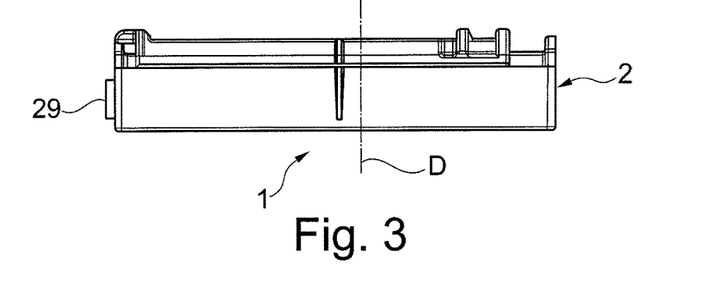
FIG. 3 shows the adjustment device according to FIG. 1 from above.
Figure 4:
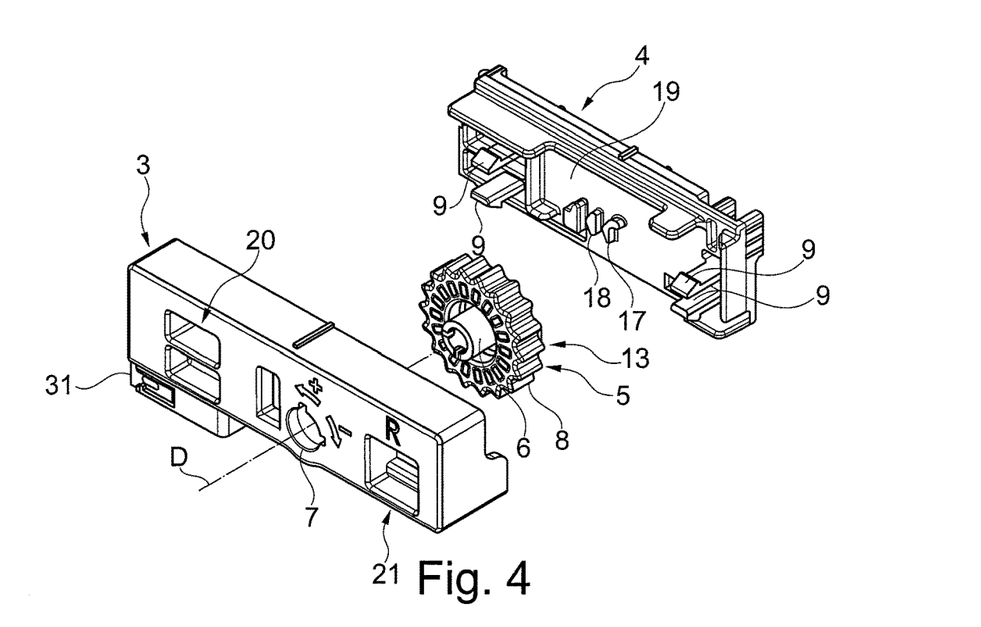
FIG. 4 shows an exploded representation of the adjustment device according to FIGS. 1 to 3.
Figure 5:
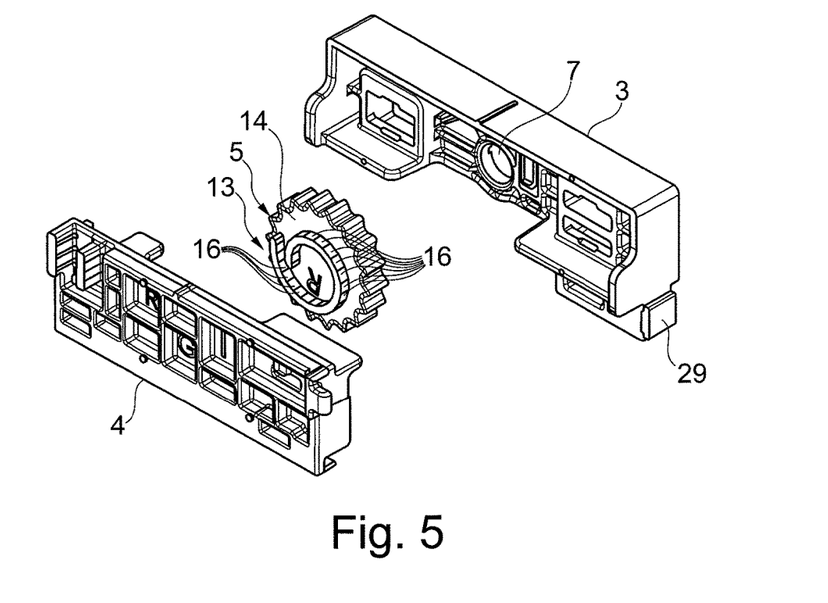
FIG. 5 shows the exploded representation of the adjustment device according to FIGS. 1 to 3, the exploded representation being turned by 180 angular degrees in relation to the view according to FIG. 4 about a vertical axis.

The adjustment device 1, which serves for adjusting the front gap between the drawer 34 and end-face portions of the furniture cabinet 35, comprises a cuboid base form and includes a housing 2 with a housing cover 3 and a housing plate 4. A disk-like adjustment element 5 of the adjustment device 1, also designated as a screw element, is received on the adjustment device 1 so as to be rotatable about an axis D. For the rotatable bearing arrangement of the adjustment element 5 on the housing cover 3, an axially protruding, sleeve-shaped, cylindrical guide pin 6, which reaches through a round opening 7 of a rotary bearing arrangement in the housing cover 3, is realized on the adjustment element 5. The adjustment element 5 mounted in the opening 7 is rotatable in a restricted manner about the axis D in a clockwise manner according to P1 and in an anti-clockwise manner according to P2 (see FIG. 1).

For manual rotation of the adjustment element 5, a control portion 8 with a toothed contour is realized in a circumferentially continuous manner on the outside of the adjustment element 5.

For the visual display of an adjustment state of the adjustment device 1, visible open display fields 20 and 21 with display elements 9 that are slidable therein are present on the housing cover 3. The display elements 9 protrude on the housing plate 4 in the direction of the housing cover 3. In addition, close to the rotational axis D on the outside of the housing cover 3, in a first information field 10 an arrow symbol with a plus sign as indication of the enlargement of the size of the front gap and in second information field 11 an arrow symbol with a minus sign as indication of the reduction in the size of the front gap. Accordingly, an enlargement in the size of the front gap is effected as a result of rotating the adjustment element 5 anticlockwise or a reduction in the size is effected as a result of rotating the adjustment element 5 clockwise.

The two releasably interlocking housing parts 3, 4 of the housing 2 form on the inside a hollow space in which the adjustment element 5 is accommodated. On a flat rear side 14 of the adjustment element 5, which is present opposite the side with the guide pin 6, an adjustment contour 13 which is spiral-shaped with respect to the rotational axis D is realized as a web which protrudes to the rear side 14. The adjustment contour 13 comprises a screw-shaped or spiral-shaped progression which is curved in its base form. In the circumferential direction with respect to the rotational axis D, the adjustment contour 13 includes radially on the inside and radially on the outside in each case a multi-edge portion 15 with surface portions 16. The adjustment contour 13 comprising the multi-edge portion 15 only radially on the inside or only radially on the outside is not, in principle, excluded.

The multi-edge portions 15 include a plurality of similar flat or even surface portions 16 which are connected together in a row and are aligned at an angle.

Figure 9:
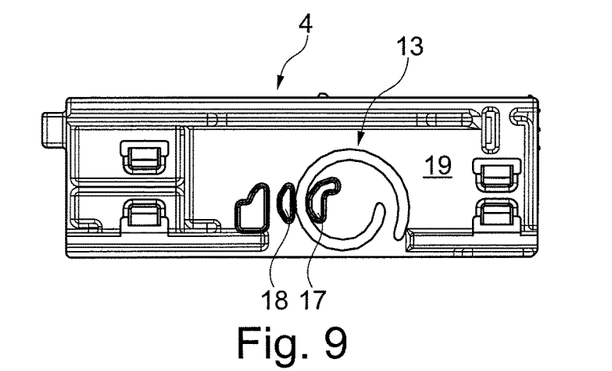
FIG. 9 shows an inside view of a housing part of the adjustment above with a spiral-shaped adjustment contour of the adjustment element in a predetermined rotational position.
Figure 10:
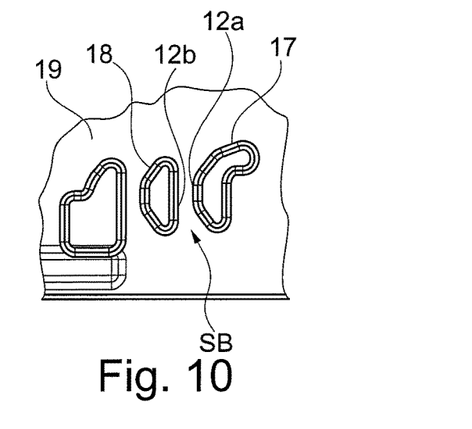
FIG. 10 shows an enlarged detail of the housing part according to FIG. 9.

In one rotational position of the adjustment element 5, in each case two oppositely situated surface portions 16 of the adjustment contour 13, which are spaced apart by the web thickness of the adjustment contour 13, interact with, in each case, a flat counter portion 12a, 12b (see FIG. 10) of elevations 17, 18 on the inside of the housing plate 4. The elevations 17, 18 are developed in a protruding manner on an even inside surface 19 of the housing plate 4. In this case, the two surface portions 16 and the counter portions 12a, 12b are situated in mutual planar abutment, which is illustrated, in particular, in FIG. 9. FIG. 9 only shows the adjustment contour 13 of the adjustment element 5 and the housing plate 3. The counter portions 12a, 12b are opposite one another and are spaced apart from one another by means of a gap region SB. The width of the gap region SB corresponds approximately to the web thickness of the adjustment contour 13. The counter portions 12a, 12b form oppositely situated, parallel aligned flat abutment surfaces, for abutment against the respective surface portions 16 of the adjustment contour 13.

By way of the planar abutment of the counter portion 12a against a radially inside surface portion 16 and by way of the planar abutment of the counter portion 12b against a radially outside surface portion 16 of the adjustment contour 13, a self-locking effect of the adjustment device 1 in each possible rotational position of the adjustment element 5 is set up. Consequently, resistance is provided against unwanted further rotation caused by external forces that are possible and occur in practice, such as short impact-like and/or lesser forces that are active over longer periods also when there is a change of load, which have an effect in the region of the surface portions 16 which abut against one another with the counter portions 12a and 12b, e.g. by compressive forces and/or tensile forces acting there on the regions 16, 12a and 12b. The adjustment device 1 is matched in such a manner that only when a person acts consciously on the adjustment element 5 and rotates it, can the currently configured rotational position of the adjustment element 5 be changed. The action of changing the rotational position of the adjustment element 5 to the front gap setting is explained further below.

Figure 6:
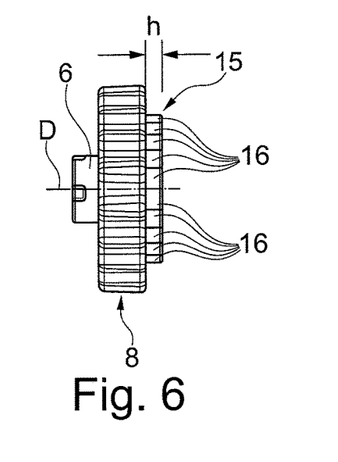
FIG. 6 shows a side view of an adjustment element of the adjustment device according to FIGS. 1 to 5.
Figure 7:
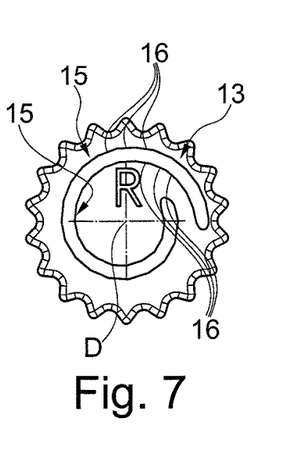
FIG. 7 and FIG. 8 show a rear view and a front view of the adjustment element according to FIG. 6.
Figure 8:
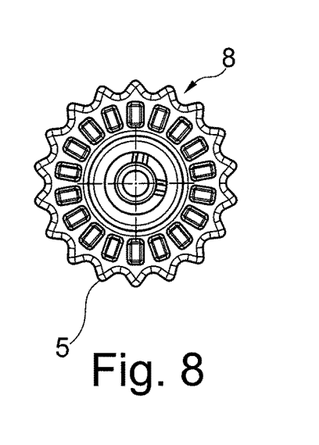

The adjustment contour 13 in the exemplary embodiment is developed circumferentially with respect to the axis D over somewhat more than 360 angular degrees. The height h of the spiral adjustment contour 13 is, for example, approximately one millimeter (see FIG. 6). The adjustment contour 13 comprises on the inside and on the outside, without interruption, the polygonal or multi-edge form of the multi-edge portion 15.

The form or size of all the surface portions 16 is preferably identical in each case on the outside and on the inside.

Figure 11:
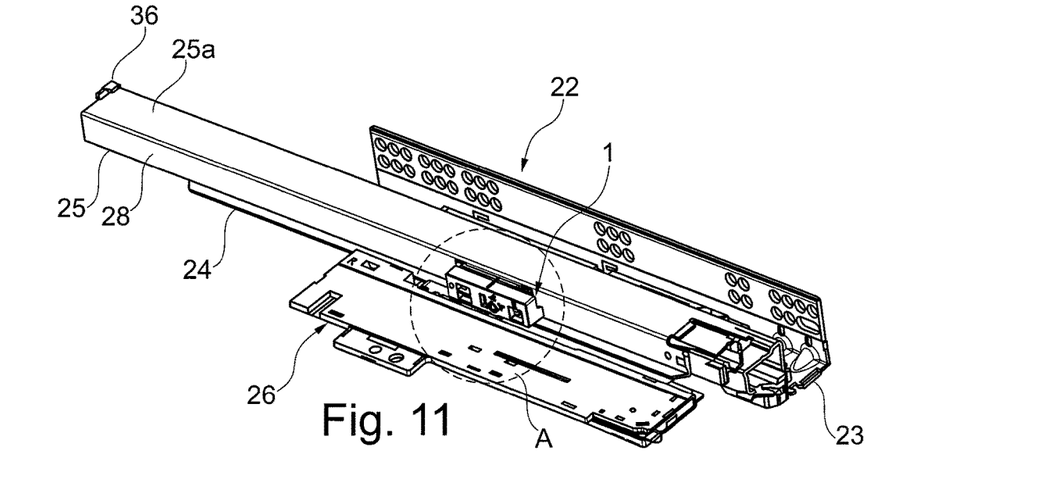
FIG. 11 shows a guide unit realized as a full pull-out runner with an adjustment device according to FIGS. 1 to 3.
Figure 12:
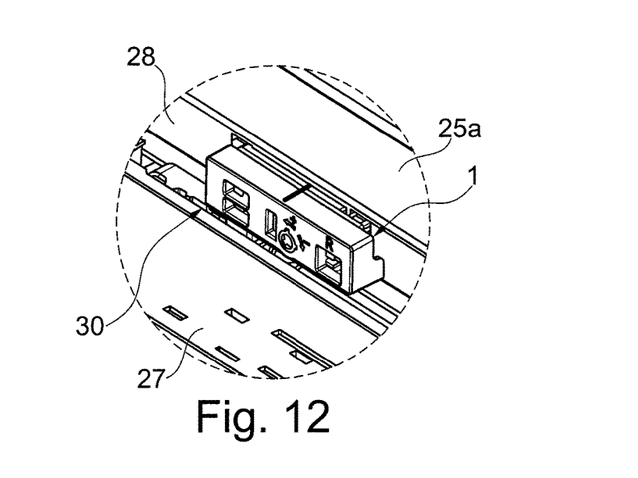
FIG. 12 shows an enlarged representation of the region A bordered by a circle in FIG. 11.

FIG. 11 shows an oblique view from above in perspective of the guide unit 22 for the drawer 34 which is supported by way of its drawer bottom on a top surface 25a of a drawer rail 25 of the guide unit 22. The guide unit 22 includes a cabinet rail 23 which is screwable to a side wall of the item of furniture 33, a center rail 24 and a drawer rail 25. In addition, an additional device 26, which comprises, in particular, an automatic draw-in mechanism 27, is provided on the cabinet rail 23 on a bottom horizontal portion. The automatic draw-in mechanism 27 serves for the automatic controlled force-supported drawing-in of the drawer 35 which rests on the guide unit 22, shortly prior to reaching the closed position on the item of furniture 33.

The additional device 26 can also be a touch-latch mechanism, or can include such a device, which ejects the drawer 34 in the opening direction P4 once it has been actuated from the outside. A device per the invention is advantageous and important to a touch-latch mechanism in order to be able to adjust the front gap. It is advantageous, in this case, that by way of the adjustment device according to the invention, which is realized as a front gap adjustment mechanism, it is possible to set a maximum possible trigger path for triggering the touch-latch mechanism. The triggering of the touch-latch mechanism is effected by actuation from the outside, by a user pressing the drawer in the closed state according to FIG. 13 inward from the front or in the closing direction P5. The minimum trigger path of the touch-latch mechanism necessary for reliable triggering has to be provided by the front gap. The front gap must consequently not be less than the necessary trigger path of the touch-latch mechanism.

The adjustment device 1 is attached to the drawer rail 25 by fitting the housing plate 4 on an inner vertically extending leg 28.

In this case, an abutment surface 29 on the housing cover 3 contacts a counter stop 30 which is fixed in position relative to the automatic draw-in mechanism 27 and consequently to the furniture cabinet, when the drawer 34 is situated in the closed state.

To adjust the front gap, the adjustment element 5 is rotated anticlockwise or clockwise, as a result of which, on account of the changed rotational position of the adjustment contour 13 and of the radius thereof with respect to the rotational axis D that is changeable in the progression in interaction with the positionally-fixed counter portions 12a, 12b, the housing cover 3 is slid forward or back in the longitudinal direction of the drawer rail 25 according to P3 relative to the housing plate 4 or to the drawer rail 25. Consequently, in the closed position of the drawer 34 with the abutment surface 29 contacting the positionally-fixed counter stop 3 on the automatic draw-in mechanism 27, the drawer rail 25 is slid correspondingly relative to the furniture cabinet 35.

As a result of the force of a draw-in spring of the draw-in mechanism 27, the drawer rail 25 and consequently the stop surface 29 is always pulled against the counter stop 30 on the draw-in mechanism 27. The stop surface 29 comprises, in the exemplary embodiment shown, a flat stop element 31 which, for example, consists of a soft rubber material.

FIG. 13 shows a strongly schematic representation of the item of furniture 33 with the drawer 34 and the guide unit 22 according to FIG. 11, the automatic draw-in mechanism 27 only being shown by a broken line. The further corresponding guide unit 32, which is situated opposite and is located at the same vertical height, also comprises an adjustment device 1 and an automatic draw-in mechanism 27. The drawer 34 is held in the closed position in the furniture cabinet 35, in particular, by the respective draw-in springs.

The drawer 34 rests, in each case, on the top surfaces 25a of the drawer rails 25 such that the drawer 34 can be pulled-out in the direction P4 and pushed-in in the direction P5. The drawer 34 is connected to the drawer rail by means of a hook element 36 on the rear end of the respective drawer rail 25, the hook elements 36a engaging in each case in an opening on the rear side of the drawer 34.

LIST OF REFERENCES

1 Adjustment device
2 Housing
3 Housing cover
4 Housing plate
5 Adjustment element
6 Guide pin
7 Opening
8 Control portion
9 Display element
10, 11 Information field
12a, 12b Counter portion
13 Adjustment contour
14 Rear side
15 Multi-edge portion
16 Surface portion
17, 18 Elevation
19 Inside surface
20, 21 Display field
22 Guide unit
23 Cabinet rail
24 Center rail
25 Drawer rail
25a Top surface
26 Additional device
27 Automatic draw-in mechanism
28 Leg
29 Stop surface
30 Counter stop
31 Stop element
32 Guide unit
33 Item of furniture
34 Drawer
35 Furniture cabinet
36 Hook element

The invention claimed is:

1. A device releasably attached to a movable furniture part of a furniture cabinet of an item of furniture, or releasably attached to a guide unit, the device adjusting a position of the movable furniture part in a closed position on the furniture cabinet, the movable furniture part being attached to the furniture cabinet via the guide unit, said device comprising:
- a positioning default mechanism provided between the furniture cabinet and the movable furniture part, the positioning default mechanism including:
  - an adjustment element, which is rotatable about a rotational axis on a rotary bearing and includes a spiral-shaped adjustment contour, and
  - an abutment portion which interacts with the spiral-shaped adjustment contour of the adjustment element,
  - wherein the abutment portion comprises:
    - a first elevated portion having a first planar counter portion, and
    - a second elevated portion having a second planar counter portion, the first and second planar counter portions opposing one another across a gap region and being parallel to one another, the gap region having a width,
  - wherein the adjustment contour comprises:
    - a web, the web having a thickness approximately equal to the width of the gap region, a first end and a second end, a radial inner surface, and a radial outer surface, and winding in a continuously tightening curve around the rotational axis, the first end and the second end being spaced apart at every position along the web, by way of which, in dependence on a rotational position of the adjustment element, the web of the adjustment contour and the first and second elevated portions of the abutment portion interact in such a manner that a stop of the device is slidable into a position, by way of which the position of the furniture part in the closed position is predeterminable,
  - wherein the adjustment contour further comprises:
    - a multi-edge portion with several surface portions which are aligned at an angle with respect to one another, the multi-edge portion formed in a circumferential direction with respect to the rotational axis of the adjustment element, the several surface portions formed on the radial inner and outer surfaces of the web,
  - wherein the web of the adjustment contour interacts with the first and second planar counter portions on the abutment portion in such a manner that several predetermined rotational positions of the adjustment element are configurable, and wherein in each said predetermined rotational position of the adjustment element, one of the several surface portions of the radial inner surface of the adjustment contour abuts against one of the first planar counter portion and the second planar counter portion, and one of the several surface portions of the radial outer surface of the adjustment contour abuts against the other of the first planar counter portion and the second planar counter portion, thereby resisting rotation of the adjustment element.

2. The device according to claim 1, wherein the multi-edge portion includes the several surface portions which are adjacent in a direction of pull-out of the adjustment contour.

3. The device according to claim 1, wherein the adjustment contour comprises the web formed as a web-shaped, protruding elevation on a base plate of the adjustment element.

4. The device according to claim 1, wherein the adjustment contour comprises the radial inner and outer surfaces formed as oppositely situated outside surfaces, wherein each said outside surface includes the several surface portions which are aligned at an angle with respect to one another.

5. The device according to claim 1, wherein the adjustment element further comprises a control portion for rotating the adjustment element from a location outside the adjustment element.

6. The device according to claim 1, wherein the abutment portion is developed on an elevation portion which is realized in a raised manner with respect to a base surface.

7. The device according to claim 1, wherein the device is releasably attached to the guide unit.

8. The device according to claim 1, wherein the device is a component, having a second device part which is slidable in a linear manner relative to a first device part of the device as a result of rotating the adjustment element, wherein the abutment portion is present on one of the first and second device parts.

9. The device according to claim 1, further comprising a visual indicator that serves for the visual display of a relative position of a slidable device part with reference to the device.

10. The guide unit having the device according to claim 1 attached thereto.

11. The item of furniture having the movable furniture part and the guide unit according to claim 10.

12. A position adjustment device releasably attached to a movable furniture part of an item of furniture, or releasably attached to a guide unit attaching the movable furniture part to the item of furniture, for adjusting a gap between the movable furniture part and the item of furniture in a closed position of the movable furniture part, the device comprising:
- a housing having a front portion and a rear portion, the front portion having an opening defining an axis, the rear portion having an inner surface; and
- a positioning default mechanism comprising:
  - an abutment portion provided on the inner surface of the rear portion of the housing, the abutment portion including at least first and second elevated portions, the first elevated portion having a first substantially flat surface portion, the second elevated portion having a second substantially flat surface portion, the first and second substantially flat surface portions opposing one another and being parallel to one another, and having a gap therebetween, the gap defining a selected width; and
  - an adjustment element, the adjustment element including a rotatable disk having a front side, an opposite rear side, a peripheral edge, a coaxial generally cylindrical guide pin projecting from the front side of the disk into the opening in the front portion of the housing, a control portion having a toothed contour defined on the peripheral edge, and an adjustment contour defined on the rear side of the disk, the adjustment contour comprising:
    - a web having a thickness, the thickness of the web being substantially equal to the selected width of the gap between the first and second substantially flat surface portions, a radial inner face and a radial outer face, and the web defining a spiral shape, the radial inner face and the radial outer face including multi-edge portions, the multi-edge portions each having a plurality of surface portions;

wherein rotation of the adjustment element moves at least a portion of the web into the gap between the first and second substantially flat surface portions to engage the surface portions of the web with the first and second substantially flat surface portions, and
the thickness of the web and the selected width of the gap between the first and second substantially flat surface portions being substantially equal defines an engagement between the plurality of surface portions of the multi-edge portions with the first and second substantially flat surface portions.

* * * * *